United States Patent [19]
Johnson

[11] Patent Number: 5,105,768
[45] Date of Patent: Apr. 21, 1992

[54] ANIMAL CANTEEN

[76] Inventor: Linda J. Johnson, 1415 Eleventh Ave., San Francisco, Calif. 94122

[21] Appl. No.: 631,101

[22] Filed: Dec. 19, 1990

[51] Int. Cl.$^5$ .......................... A01K 5/00; A01K 7/00
[52] U.S. Cl. .................................... 119/61; 119/72; 224/148; 215/228
[58] Field of Search ................. 119/63, 72, 61, 51.01; 224/148; 222/548; 215/228, 100.5; D7/511; D3/30.1, 51

[56] References Cited

U.S. PATENT DOCUMENTS

| | | | |
|---|---|---|---|
| D. 233,972 | 12/1974 | Juhlin | D7/511 |
| 1,778,175 | 10/1930 | Thune | D7/511 |
| 2,656,958 | 10/1953 | Austin | 224/148 |
| 3,495,751 | 2/1970 | Moran | 224/148 |
| 3,568,875 | 3/1971 | Olan | 119/61 |
| 4,350,274 | 9/1982 | Morgan | 224/148 |
| 4,436,056 | 4/1984 | MacLeod | 119/61 |
| 4,762,087 | 10/1988 | Henecke | 119/61 |
| 4,880,112 | 11/1989 | Conrad | 119/61 |
| 4,899,693 | 1/1990 | Arnold | 119/1 |

*Primary Examiner*—John G. Weiss

[57] ABSTRACT

A portable animal utensil having dish and water jug combined into one item. Only one item need be brought from home to satisfy the nutritional requirements of animals while away from home.

The canteen has a container 4 which serves as a reservoir for water. The canteen has a wide opening providing an aperture 6 to permit access by an animal to the contents of the container and to permit filling of the container with water.

A lid 10 is provided which is sized to fit the wide opening. Means are provided for removably securing the lid to the container and for creating a water tight seal 8 and 12.

Rigid loops 14 are attached to opposite outer walls of the container and are provided for the retention of a carry strap 18. This carry strap is placed over the animal owner's shoulder for transporting the utensil.

The bottom of the canteen has means for removably securing the lid to the bottom of the container 20 while the animal is drinking. Securing the lid to the bottom of the container keeps the lid from getting lost and / or dirty. The upper surface of the lid is provided with high friction, non-skid means 22. When the lid is secured inverted to the bottom of the container, the high friction, non-skid means help prevent the utensil from sliding around on the floor or similar surface.

2 Claims, 2 Drawing Sheets

ANIMAL CANTEEN

BACKGROUND

1. Field of Invention

This invention relates to portable animal utensils, specifically to a wide mouth canteen which combines dish and water jug into one item.

2. Description of Prior Art

Animals, especially pet animals, often accompany their owners while traveling, going to the beach, shopping, camping, jogging, back packing, hiking, or enjoying other sports.

Water and or nourishment must be brought along on these outings in order to insure the health and comfort of the animals. A spill resistant container which is easy to carry and simple to use is necessary to fulfill the requirements of the animals.

Several attempts were made to provide a spill resistant pet dish for use while traveling. U.S. Pat. No. 4,436,056 (1984) to MacLeod disclosed a device which loses its spill resistant qualities when in any position but upright. It has no carry straps.

Carrying this device in an upright position along a trail with no carry straps would be bulky, awkward, and preposterous.

Trying to carry this device filled with water from home to car without spilling would be difficult. It would require at least one free hand, and therefore may require that additional trips from home to car be made.

Another attempt to create a travel pet bowl was made by Hendecke (1988). This bowl, however, requires setting up of the device before use: remove device from pouch, unfold it into an upright position, remove the plug from the valve, insert air, and finally pour water into the dish. After use, the plug must be removed, the device deflated, folded, and stored in a pouch. The material used to make the bowl is flexible and therefore may be subject to puncture. This device requires that the user bring along a second container from which to pour water into the device.

Another attempt to create a travel animal utensil was made by Arnold in U.S. Pat. No. 4,899,693 (1990). This canteen is also a dog cooling bed. This bed is used infrequently by most pet owners—most of the time only the canteen is needed. Water is needed by an animal all year round, whereas pets only need to be cooled in the hot summer months. Thus, extra equipment must be hauled around by a pet owner.

Also, if this device is a pet bed as well, the size may be larger than that needed if the device serves as a canteen only.

Arnold's device must be dismantled to get to the base which serves as a pet drinking dish. After the pet finishes drinking, the device must be reassembled.

SUMMARY OF THE INVENTION

It is, therefore, an object of this invention to provide an improved portable animal utensil. Accordingly, several object and advantages of my invention are:

(a) to provide a drinking dish and a water carrying jug which are combined into one item so that only one item must be carried from the home in order to satisfy an animal's nutritional requirements;

(b) to provide a drinking dish and a water carrying jug which are combined into one item making it unnecessary to pour water from one container into another while out traveling;

(c) to provide a durable, non-toxic, reusable, shatter proof utensil with no sharp edges to injure animals or people;

(d) to provide a utensil which is light in weight, small in size, and of a body conforming shape for easy transport;

(e) to provide a utensil which has a large opening so that it is easy to clean—eliminating unpleasant odors or tastes and contributing to the health of the animal;

(f) to provide a utensil which is simple and economic to manufacture;

(g) to provide a utensil which is ergonomic and easy and fast to use—just remove and replace the lid;

(h) to provide a utensil which is technically simple and with few components in order to reduce the need for repairs;

(i) to provide a utensil which is useful all year round and will never become obsolete;

(j) to provide a utensil to assist in fulfilling legal requirements that all pets left in unattended vehicles have water or other liquids available to them at all times;

(k) to provide a utensil that may be used for many different types of animals of many different sizes;

(l) to provide a utensil that may be used to carry food as well as liquids;

(m) to provide a utensil with a wide diameter for a wide stance for resistance to tipping;

(n) to provide a utensil with a similar appearance to canteens for humans which will be easily recognizable as such;

(o) to provide a portable utensil for animals which is so easy to use that no animal will ever be thirsty on the trail nor left at home because he is too much trouble to bring with;

(p) to provide a utensil which has a convenient carry strap;

(q) to provide a utensil which is truly spill proof in any position during transport of the device;

(r) to provide a utensil which is made of durable materials which will resist the teeth and claws of animals;

(s) to provide a utensil for meeting the nutritional requirements of animals which allows convenience arising from the fact that only necessary equipment which is needed all year round and is supplied in a small, portable size be carried by an animal's owner.

Further objects and advantages will become apparent from a consideration of the ensuing descriptions and drawings.

Reference Numerals in Drawings

Figure 1:
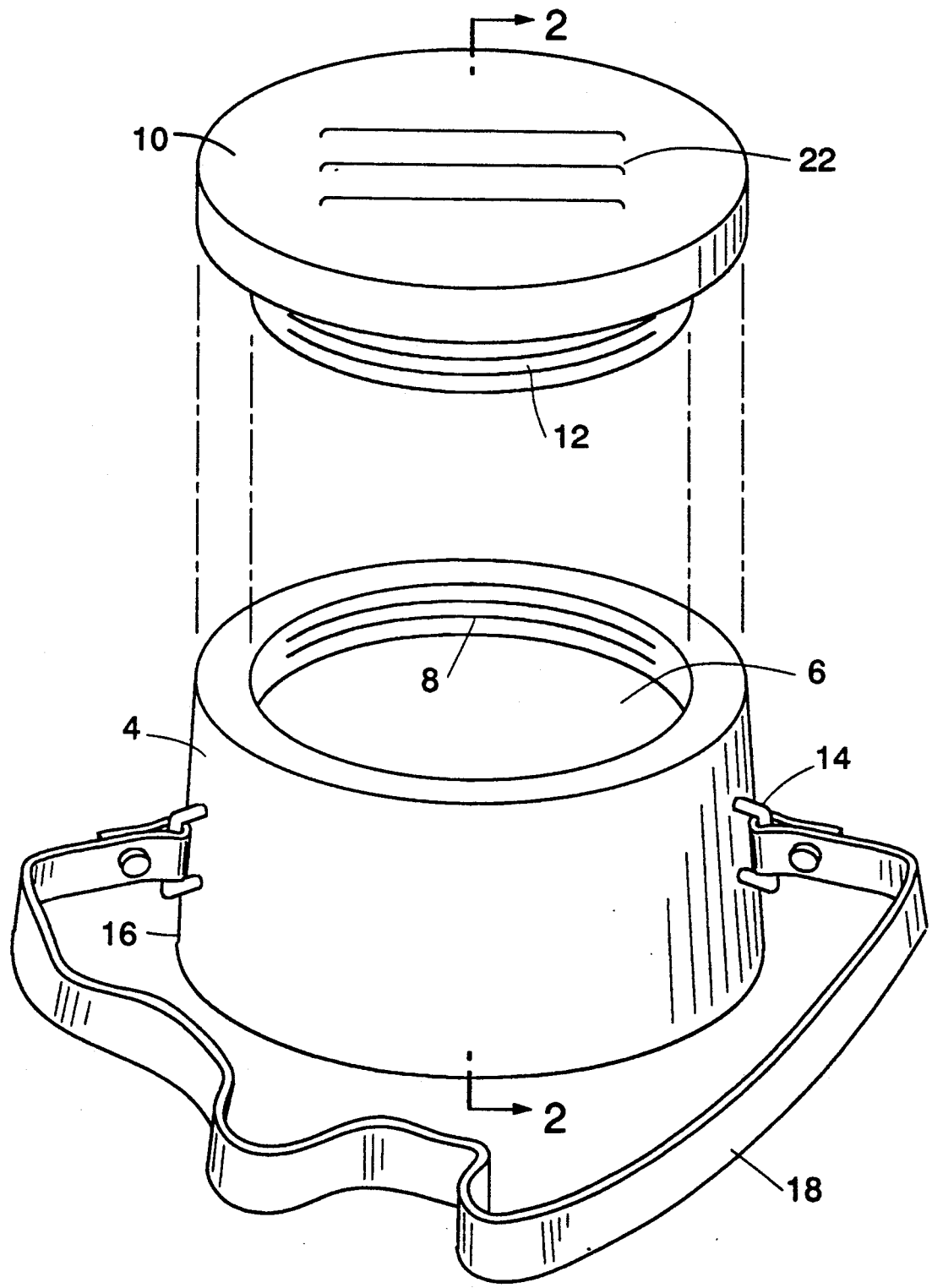
FIG. 1 is an exploded perspective view showing a portable animal utensil incorporating the invention with the lid removed from the container.

4: container
6: access aperture
8: means for removably securing the inner upper portion of the container to the lid and creating a water tight seal
10: lid 12: means for removably securing the lower portion of the lid to the container and creating a water tight seal
14: rigid loops
16: opposite outer walls of the container
18: carry strap
20: means for removably securing the lid to the bottom of the container
22: high friction, non-skid means

DESCRIPTION OF THE PREFERRED EMBODIMENT

Figure 2:
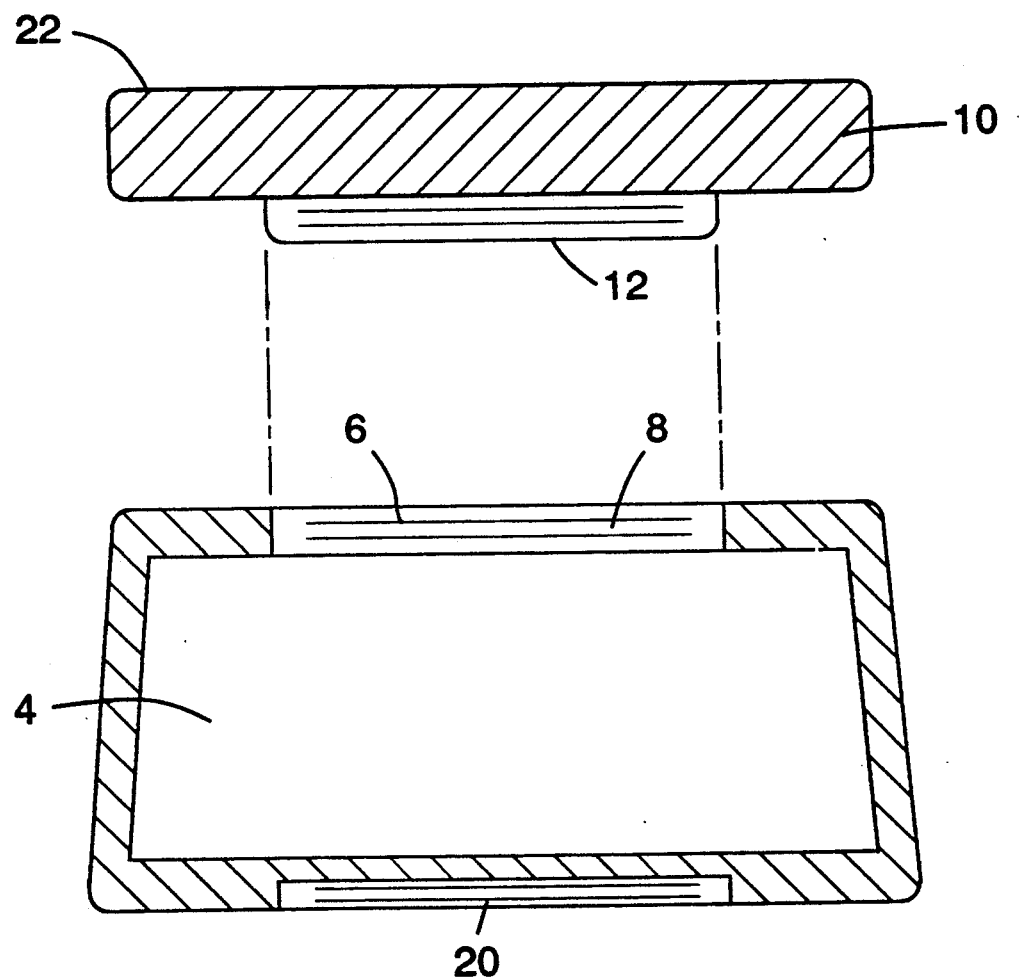
FIG. 2 is an exploded vertical cross-sectional view taken along line 2—2 of a portable animal utensil incorporating the invention with the lid removed from the container.

A typical embodiment of the present invention is illustrated in FIG. 1 (exploded perspective view) and FIG. 2 (exploded vertical cross-sectional view taken along line 2—2).

FIG. 1 shows a container 4 having an open upper portion thereby providing an access aperture 6. The access aperture may be equal in size to or smaller than the diameter of the container.

A lid 10 is provided for the container. High friction, non-skid means 22 are provided on the upper side of the lid.

Means for removably securing the inner upper portion of the container to the lid and creating a water tight seal 8 are provided.

Means for removably securing the lower portion of the lid to the container and creating a water tight seal 12 are provided.

Rigid loops 14 are provided on opposite outer walls of the container 16 for the retention of a carry strap 18.

FIG. 2 shows an exploded vertical cross-sectional view of the invention taken along line 2—2 of a container 4 with an open upper portion providing an access aperture 6. A lid 10 is provided for the container. High friction, non-skid means 22 are provided on the upper side of the lid.

Means for removably securing the inner upper portion of the container to the lid and creating a water tight seal 8 are provided.

Means for removably securing the lower portion of the lid to the container and creating a water tight seal 12 are provided.

Means for removably securing the lid to the bottom of the container 20 are provided.

Operation—FIGS. 1 and 2

With reference now to the drawings, this invention will be described in greater detail.

FIG. 1 shows a container 4 which serves as a reservoir for water. The container has an open upper portion thereby providing an access aperture 6. The container is filled with water through this access aperture. An animal sticks his mouth through the access aperture and consumes the contents of the container. The access aperture must be sufficiently wide enough to permit animals of all sizes access to the contents of the container.

A lid 10 is provided for the container. The lid prevents spillage of the contents of the container during transport and while the animal is not drinking. The lid keeps the contents of the container safe from contamination.

Means of removably securing the inner upper portion of the container to the lid and creating a water tight seal 8 are provided. Also, means of removably securing the lower portion of the lid to the container and creating a water tight seal 12 are provided.

The lid of the container is removed to allow access by an animal to the contents of the container.

FIG. 2 shows means for removably securing the-lid to the bottom of the container 20. While the animal is drinking, the lid is secured to the bottom of the container. This keeps the lid from getting lost or dirty.

The lid is provided with high friction, non-skid means 22 on its upper side. This helps prevent the utensil from sliding around while the animal is drinking and the lid is secured, inverted, to the container bottom.

When the animal is finished drinking, the lid is replaced on the container.

FIG. 1 shows rigid loops 14 which are provided on opposite outer walls of the container 16. The rigid loops retain a carry strap 18. The carry strap is slung around the shoulder of the animal's owner allowing hands free transport of the canteen.

SUMMARY

Thus the reader will see that the portable animal utensil of the invention provides a wide mouth canteen which combines dish and water jug into one item. Only one item must be brought from the home in order to satisfy the nutritional needs of an animal while traveling. The present invention makes it unnecessary to pour water from one container into another.

While my above description contains many specificities, these should not be construed as limitations on the scope of the invention, but rather as an exemplification of one preferred embodiment thereof. Many other variations are possible. For example it may be used for many different animals including but not limited to pets;

it may be used to carry food and other liquids as well as water;

a full open canteen may be placed in a refrigerator to cool the contents before taking the canteen out traveling;

ice may be added to the liquid in the canteen;

other cooling substances or devices may be added to the contents of the canteen as long as they pose no safety hazard;

the carry strap may be placed around the shoulder of the animal owner for transportation of the canteen. Alternately, the strap may be removable so that a shorter strap may be attached. This shorter strap may be placed around the animal's neck so that the animal may carry his canteen himself if he is sufficiently strong;

this shorter strap may be used to carry the canteen by the animal owner's hand;

a rigid handle may be added to the canteen for use in carrying the canteen by hand;

a hook or hooks may be attached to the canteen so that the canteen may be attached to an animal's collar, harness, or to camping equipment such as a back pack, or to a runner's belt, or other such equipment;

to increase anti spill/splash qualities, the aperture may be made smaller than the diameter of the top of the canteen;

also, the top of the canteen may be sloped downward toward the center so that any spills go back into the container;

the container may be divided into more than one section so that more than one nutritive substance may be supplied;

the canteen may have more than one reservoir and more than one lid;

the material of the canteen may be dishwasher safe thereby eliminating unpleasant odors or tastes and thus contributing to a healthier animal;

the size of the canteen may vary depending on the size and needs of the animal it is used for;

the materials used to manufacture the canteen may also include those with insulating qualities or be double walled;

space may be provided to add cooling substances or devices to the structure of the canteen;

the size, materials, form, color, and shape of the canteen may vary.

Accordingly, the scope of the invention should be determined not by the embodiment (s) illustrated, but by the appended claims and their legal equivalents.

I claim:

1. A portable animal utensil comprising:

(a) a container having an outer wall, an animal-accessible interior chamber for retaining food or water, an opening to permit access by an animal to the interior chamber of the container, and a closed bottom;
    (b) a lid sized to fit the opening of the container;
    (c) means for removably securing said lid to the opening to form a water-tight seal;
    (d) means for securing said lid to the bottom of the container;
    (e) means coupled to outer wall of the container for securing a carrying strap or handle.

2. The portable animal utensil of claim 1 wherein said lid is provided with high friction, non-skid means on one surface so that the non-skid means is exteriorly exposed when said lid is secured to the bottom of the container.

* * * * *